(12) United States Patent
Beason et al.

(10) Patent No.: US 9,690,774 B1
(45) Date of Patent: Jun. 27, 2017

(54) IDENTIFYING VAGUE QUESTIONS IN A QUESTION-ANSWER SYSTEM

(71) Applicant: International Business Machines Corporation, Armonk, NY (US)

(72) Inventors: William A. Beason, Austin, TX (US); Vincent J. Dowling, Austin, TX (US); Anne E. Gattiker, Austin, TX (US); Lakshminarayanan Krishnamurthy, Round Rock, TX (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/971,331

(22) Filed: Dec. 16, 2015

(51) Int. Cl.
*G06F 17/30* (2006.01)
*G06F 17/27* (2006.01)

(52) U.S. Cl.
CPC ...... *G06F 17/2775* (2013.01); *G06F 17/2705* (2013.01); *G06F 17/30401* (2013.01)

(58) Field of Classification Search
None
See application file for complete search history.

(56) References Cited

U.S. PATENT DOCUMENTS

| | | | |
|---|---|---|---|
| 6,336,029 B1 | 1/2002 | Ho | |
| 8,782,777 B2 | 7/2014 | Friedlander et al. | |
| 8,972,905 B2 | 3/2015 | Bradford et al. | |
| 2007/0118519 A1 | 5/2007 | Yamasawa et al. | |
| 2011/0083167 A1* | 4/2011 | Carpenter | G06F 17/30563 726/4 |
| 2013/0288219 A1 | 10/2013 | Dheap et al. | |
| 2015/0142851 A1 | 5/2015 | Gupta et al. | |
| 2015/0178623 A1 | 6/2015 | Balani et al. | |
| 2016/0070791 A1* | 3/2016 | Eberhart | G06F 17/30864 707/706 |

OTHER PUBLICATIONS

Wang et al., "Automatic Question Generation for Learning Evaluation in Medicine," Advances in Web Based Learning, ICWL 2007, 6th International Conference, Edinburgh, UK, Aug. 2007, pp. 242-251.

Heilman et al., "Good Question! Statistical Ranking for Question Generation," HLT '10 Human Language Technologies: The 2010 Annual Conference of the North American Chapter of the Association for Computational Linguistics, May 2010, Los Angeles, CA, pp. 609-617.

(Continued)

*Primary Examiner* — Son T Hoang
(74) *Attorney, Agent, or Firm* — VanLeeuwen & VanLeeuwen; William J. Stock

(57) ABSTRACT

An approach is provided that improves a question answering (QA) computer system by reducing a number of vague questions submitted to the QA system. When a question is submitted to the QA system, the approach performs a vagueness question analysis on the question. The vagueness question analysis results in a vagueness score. The question is submitted to the QA system in response to the vagueness score reaching a threshold value that indicates a lack of vagueness in the question. The approach inhibits submission of the question to the QA system in response to the vagueness score failing to reach the threshold value.

17 Claims, 6 Drawing Sheets

(56) References Cited

OTHER PUBLICATIONS

Zheng et al., "K2Q: Generating Natural Language Questions from Keywords with User Refinements," Proceedings of the 5th International Joint Conference on Natural Language Processing, Nov. 2011, Chiang Mai, Thailand, pp. 947-955.
Beason et al., "Domain-Specific Question-Answer Pair Generation," U.S. Appl. No. 14/810,723, filed Jul. 28, 2015, 24 pages.
Heilman, "Automatic Factual Question Generation from Text," Submitted in partial fulfillment of the requirements for the degree of Doctor of Philosophy in Language and Information Technologies, Language Technologies Institute, School of Computer Science, Carnegie Mellon University, Pittsburgh, PA, 2011, 203 pages.
Kotov et al., "Towards Natural Question-Guided Search," International World Wide Web Conference, Apr. 2010, Raleigh, NC, 10 pages.
Wolfe, "Automatic Question Generation from Text—An Aid to Independent Study", Navy Personnel Research and Development Center, 1976, pp. 104-112.

\* cited by examiner

IDENTIFYING VAGUE QUESTIONS IN A QUESTION-ANSWER SYSTEM

BACKGROUND

A challenge facing question answering (QA) systems is the submission of vague questions. When a vague question is posed to a QA system, the QA system often makes mistakes and provides an incorrect answer. Question vagueness can occur for several reasons, such as the requestor failing to provide a context for the question. For example, if a requestor poses the question "What is the treatment for the disease?" the QA system is provided little context for the question. In addition, the term "the disease" appears to reference a previously discussed disease, but no reference is provided to the QA system in the question to resolve the missing reference. Current QA systems often attempt to solve such vague questions. In the example, the QA system might conclude that "the disease" refers to a most common disease, such as the common cold, and provide treatments for the common cold. However, the requestor might have been asking about a different disease, the treatment for which might be considerably different than the treatments found for the common cold.

BRIEF SUMMARY

An approach is provided that improves a question answering (QA) computer system by reducing a number of vague questions submitted to the QA system. When a question is submitted to the QA system, the approach performs a vagueness question analysis on the question. The vagueness question analysis results in a vagueness score. The question is accepted for processing by the QA system in response to the vagueness score reaching a threshold value that indicates a lack of vagueness in the question. The approach inhibits processing of the question to the QA system in response to the vagueness score failing to reach the threshold value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
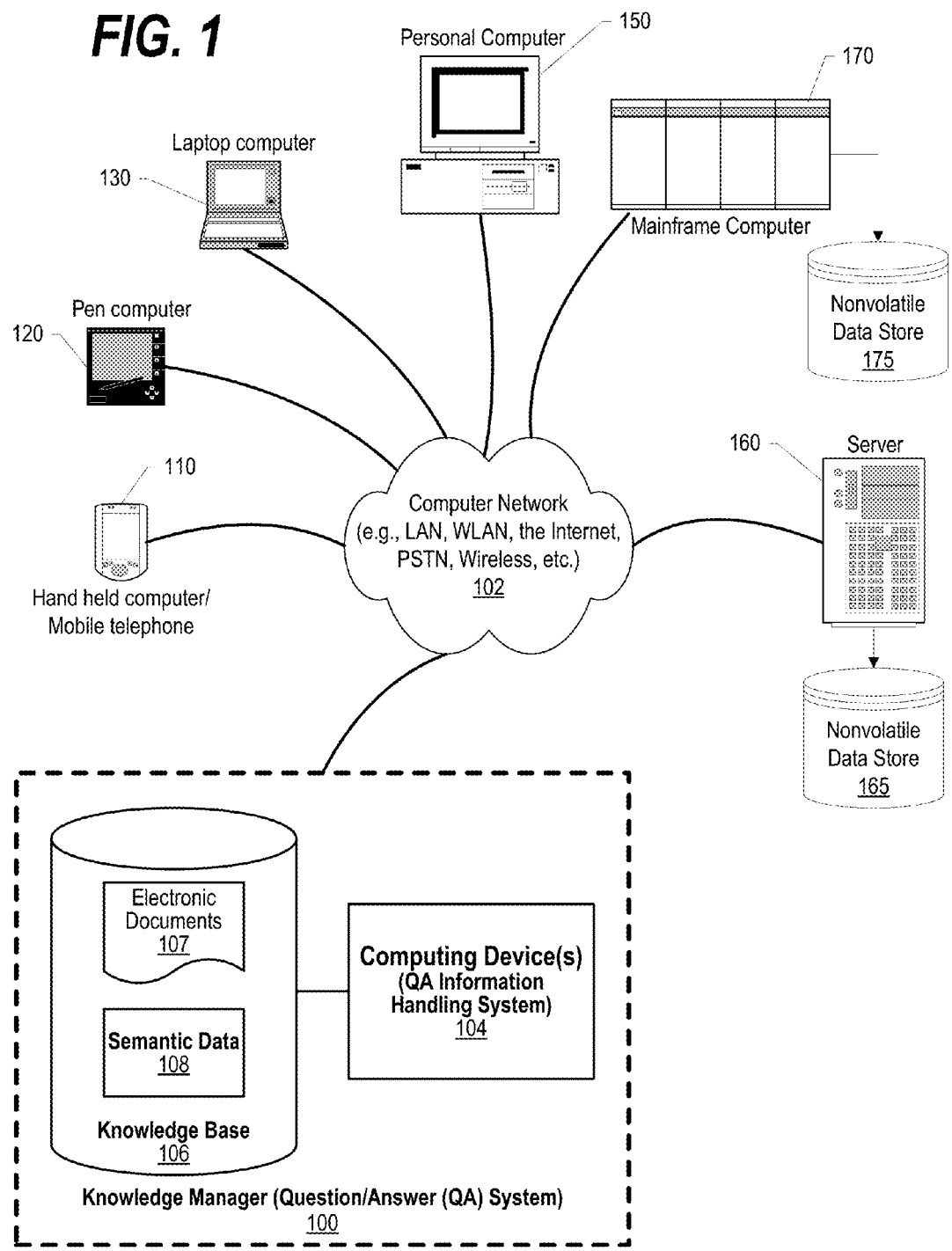
FIG. 1 depicts a schematic diagram of one illustrative embodiment of a question answering (QA) system in a computer network.

FIGS. 1-6 depict an approach that identifies vague questions in a question-answer (QA) system. The approach computes a score that determines the vagueness of a given question based on a set of linguistic features given a sentence. The linguistic features are calculated based on Natural Language Processing (NLP) techniques that are performed via a rule-based method which are then used to classify an input question given a set of labeled question set.

Below are listed some examples of vague questions and the cause for vagueness:
  What is the treatment for this disease?
    Lacks context; no referent for referential pronoun
  What is the treatment?
    Lacks context
  What is the prettiest lake in Michigan?
    Arguable superlative The approach utilizes the following lists of words as inputs to the system:
  General Terms—this consists of all general terms in the English language. Such lists are readily available from various sources.
  Domain Specific Terms—this consists of the set of English terms that are specific to a particular domain. These terms are referred to as concepts or topics and concept instances. This data store provides domain specific concepts and concept instances.

Below are listed some examples of concepts, with alternate terms for each concept in parentheses:
  Condition (disease)
  Symptom (sign)
  Procedure (test, diagnostic)
  Population (set of people, group)

Concept instances consists of the set of domain specific concept instances which are specific instances of the concepts described above. For example, if the concept is disease, then example concept instances would be diabetes, heart disease, etc.

As mentioned above, the approach computes a score based on the vagueness of a question. In one embodiment, a higher score signifies that the question is less vague (more specific). Thus, in this embodiment, questions that receive higher scores are preferred as input to the QA system. In a further embodiment, questions that receive a vagueness score below a particular threshold are flagged and the requestor of the question is prompted to rephrase the question to make the question less vague. The prompt may also include reasons that the question was found to be vague and suggestions to improve the question to provide better input to the QA system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
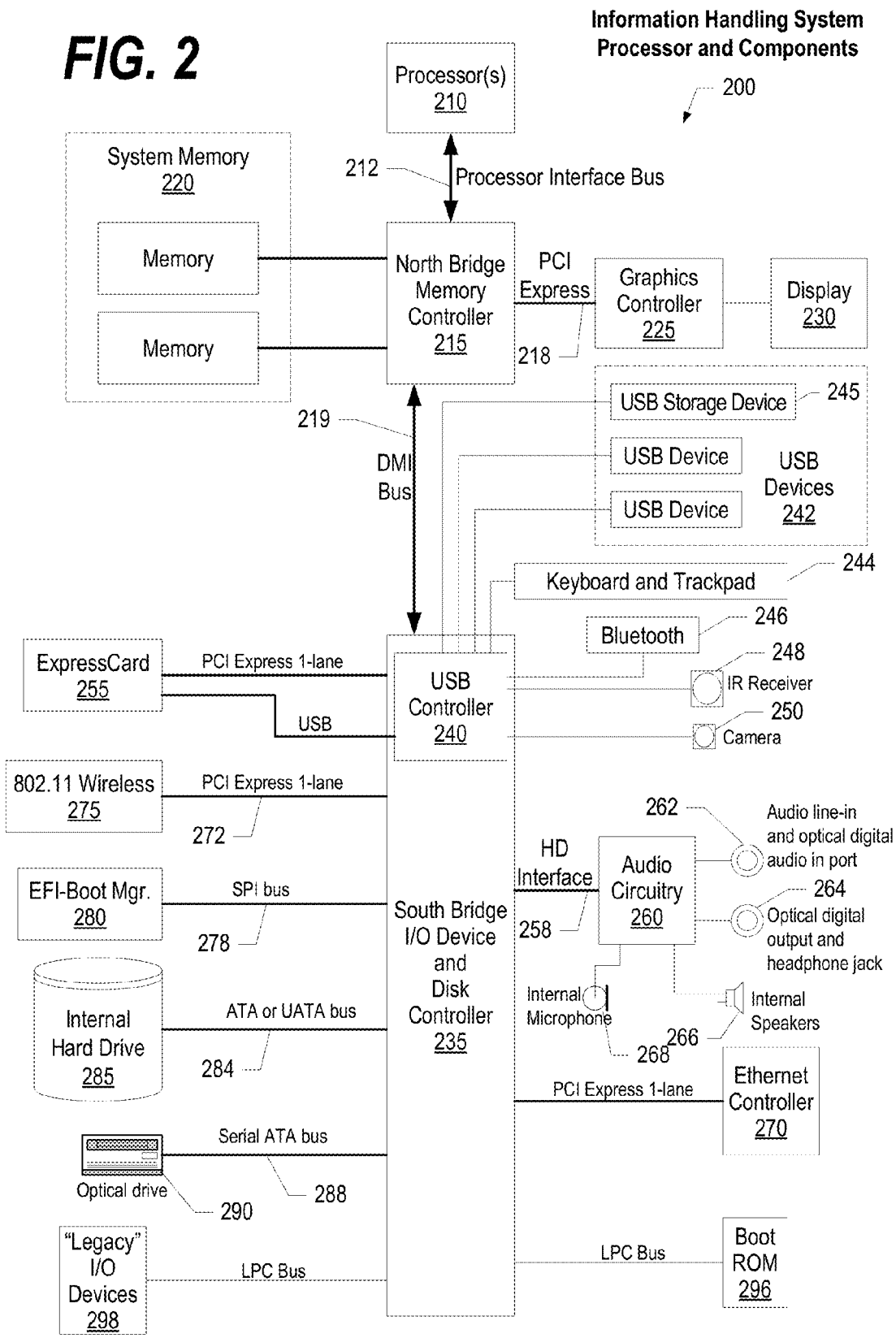
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
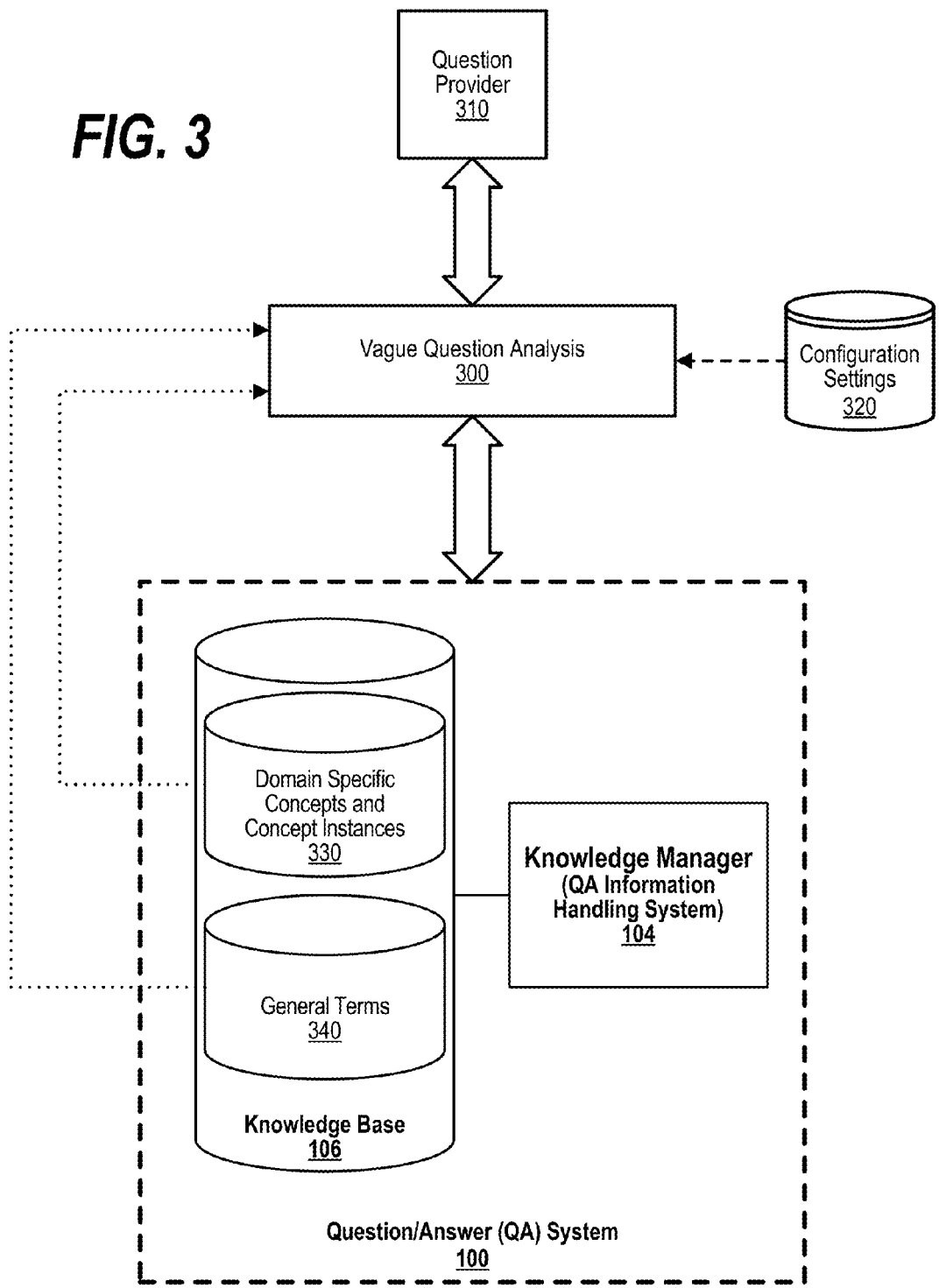
FIG. 3 is an exemplary diagram depicting the components utilized in identifying vague questions in a question-answer (QA) system.

FIG. 3 is an exemplary diagram depicting the components utilized in identifying vague questions in a question-answer (QA) system. Vague question analysis process 300 receives questions posed to a question answering (QA) system from a requestor, shown as question provider 310. Configuration settings 320 can be established to control the vagueness threshold value needed to automatically submit the question to the QA system when little or no vagueness is found in the submitted question. Configuration settings may also be established to provide various increases and decreases to the vagueness score that is calculated by the vague question analysis process. These increases and decreases correspond to linguistic features either found in the question or noted as being absent from the question text.

A question is automatically sent to QA system 100 if the vagueness score calculated by process 300 is found to indicate a lower level, or lack of, vagueness in the question that is being posed by requestor 310. Linguistic data is utilized by process 300 when analyzing the question for vagueness. This linguistic data includes Domain Specific Concepts, and Concept Instances which is retrieved from data store. In one embodiment, these data stores are maintained by QA system 100, while in an alternate embodiment, these data stores are maintained separately from the QA system. In either case, the data stores are accessible by the vague question analysis process 300. Also, in one embodiment process 300 is included as a component of the QA system acting as a pre-processor that filters out vague questions directed at the QA system, while in another embodiment, process 300 is a process external to the QA system that filters questions before submitting them to the QA system.

Figure 4:
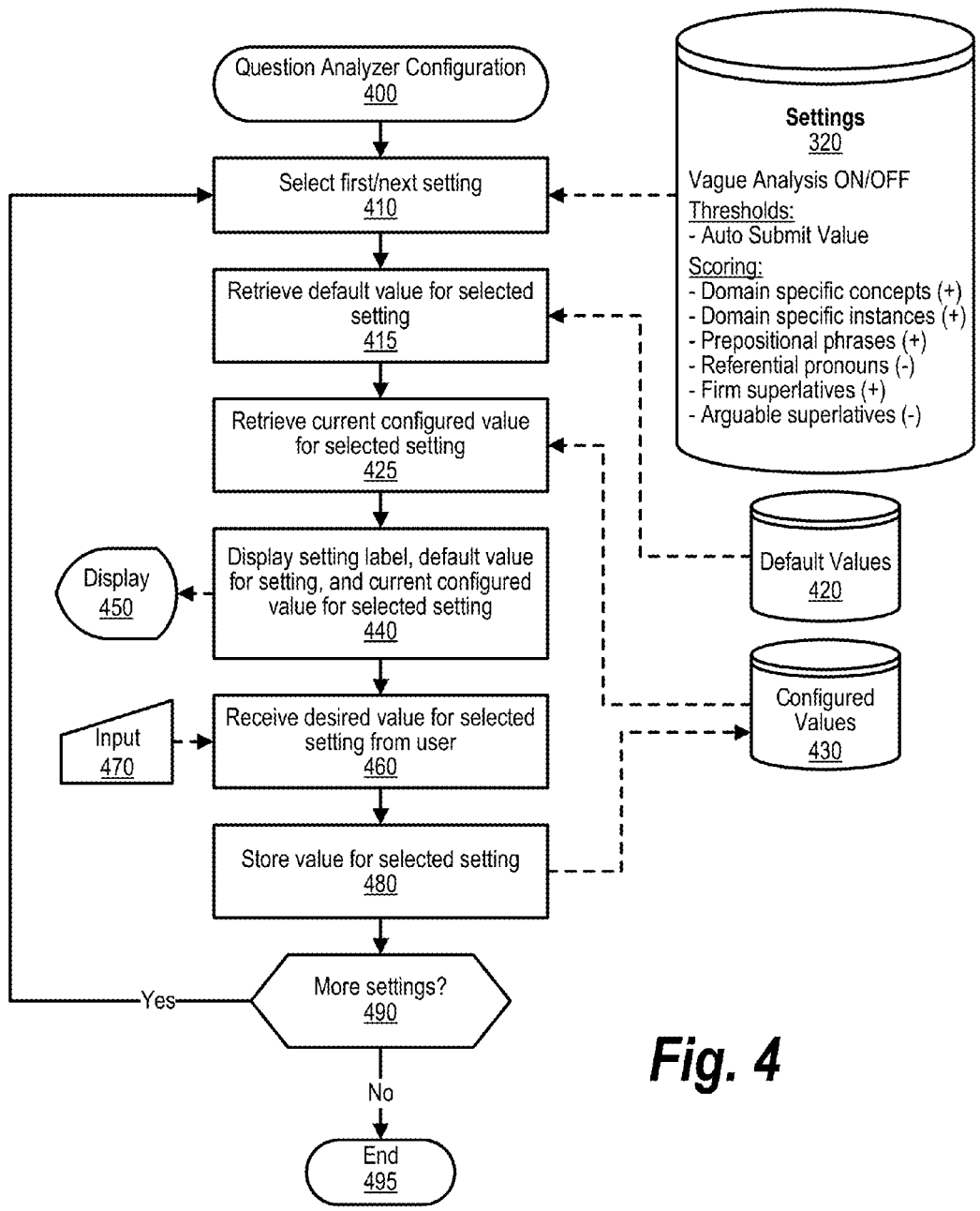
FIG. 4 is an exemplary flowchart that performs steps to configure a question analyzer that is used to identify vague questions posed to a question-answer (QA) system.

FIG. 4 is an exemplary flowchart that performs steps to configure a question analyzer that is used to identify vague questions posed to a question-answer (QA) system. FIG. 4 processing commences at 400 and shows the steps taken by a process that configures a vague question analyzer. At step 410, the process selects the first setting from the list of configuration settings stored in data store 320. Configuration settings included in data store 320 include vague analysis (on/off) which sets whether vagueness analysis is currently enabled (on) or is currently disabled (off). The vagueness threshold value is the vagueness value that needs to be reached in order for the question to not be deemed vague and automatically submitted to the QA system.

Linguistic feature scoring provides for a value that is used to increase or decrease the vagueness score when particular linguistic features are found in the question or noted as being absent from the question. The linguistic features that are scored include whether domain specific concepts are included in the question with a value that increases the vagueness score, whether domain specific instances are included in the question with a value that increases the vagueness score, whether prepositional phrases are included in the question with a value that increases the vagueness score, whether referential pronouns are included in the question with a value that decreases the vagueness score, whether firm superlatives are included in the question with a value that increases the vagueness score, and whether arguable superlatives are included in the question with a value that decreases the vagueness score. Other linguistic features can be included as desired with corresponding values that increase or decrease the vagueness score when such features are found in the question or noted as being absent from the question.

At step 415, the process retrieves the default value corresponding to the selected setting. The default values are retrieved from data store 420. At step 425, the process retrieves the current configured value corresponding to the selected setting. The current configured values are retrieved from data store 430. At step 440, the process displays the selected setting description, the selected setting's default value, and the selected setting's currently configured value. This information is displayed to the user that is configuring the system on display 450. At step 460, the process receives the desired value for the selected setting from the user. The user provides the desired value using input device 470. At step 480, the process stores the value received from the user for the selected setting in data store 430.

The process next determines as to whether there are more settings to be configured by the user (decision 490). If there are more settings to be configured by the user, then decision 490 branches to the 'yes' branch which loops back to step 410 to select and processes the next setting as described above. This looping continues until there are no more settings to be configured, at which point decision 490 branches to the 'no' branch exiting the loop. Configuration processing provided by FIG. 4 thereafter ends at 495.

Figure 5:
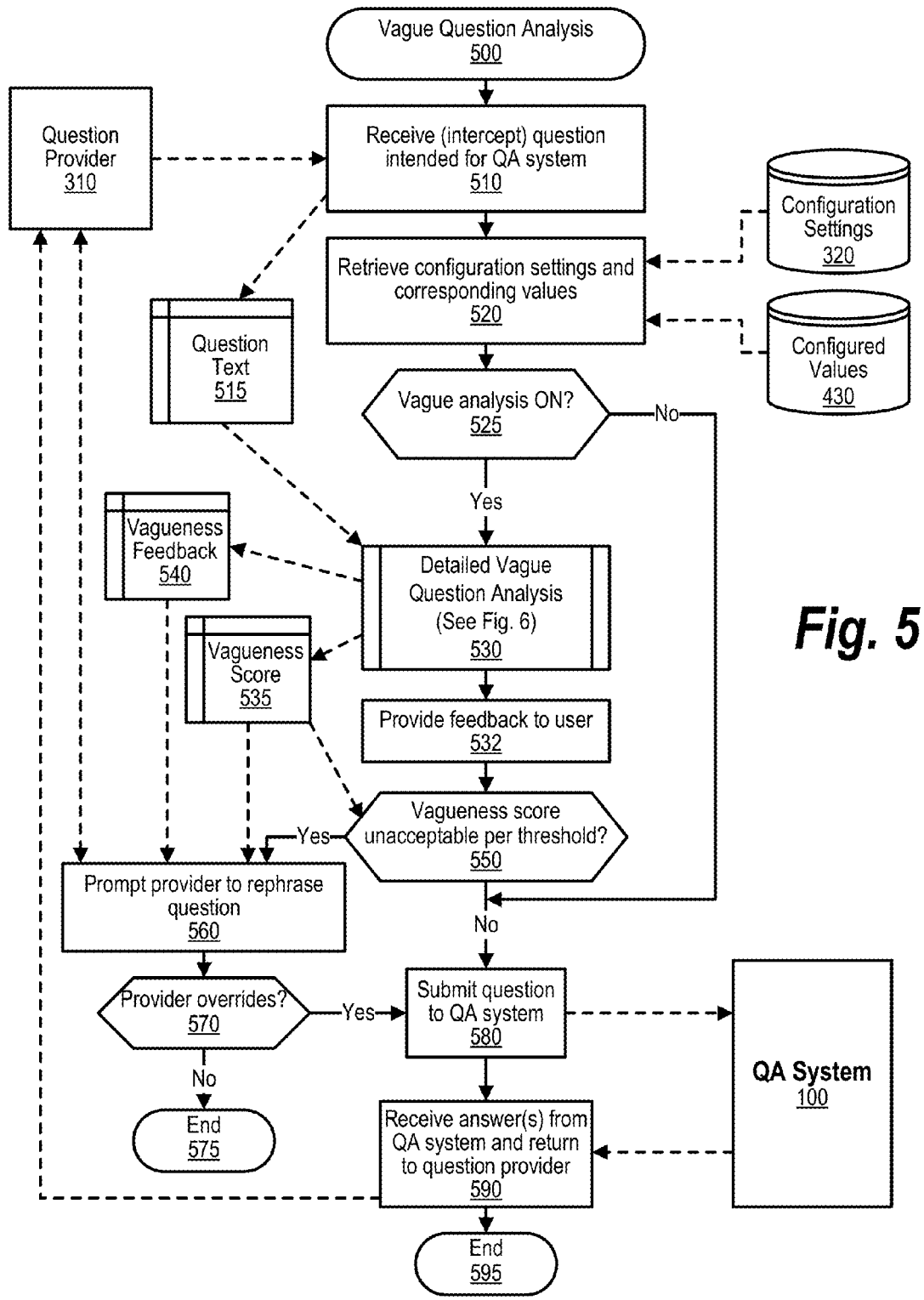
FIG. 5 is an exemplary flowchart that performs a vague question analysis on a question posed by a question provider.

FIG. 5 is an exemplary flowchart that performs a vague question analysis on a question posed by a question provider. FIG. 5 processing commences at 500 and shows the steps taken by a process that performs the vague question analysis. At step 510, the process receives, or intercepts, a question posed by requestor 310 and intended for submission to the QA system. Step 510 stores the question text in memory area 515. At step 520, the process retrieves the configuration settings and the currently configured values pertaining to the settings. The configuration settings are retrieved from data store 320 and the currently configured values are retrieved from data store 430.

The process determines as to whether the vagueness analysis has been turned ON (decision 525). If the vagueness analysis has been turned ON, then decision 525 branches to the 'yes' branch to process the question for vagueness. On the other hand, if the vagueness analysis is turned OFF, then decision 525 branches to the 'no' branch bypassing steps 530 through 575 and skipping to step 580.

Figure 6:
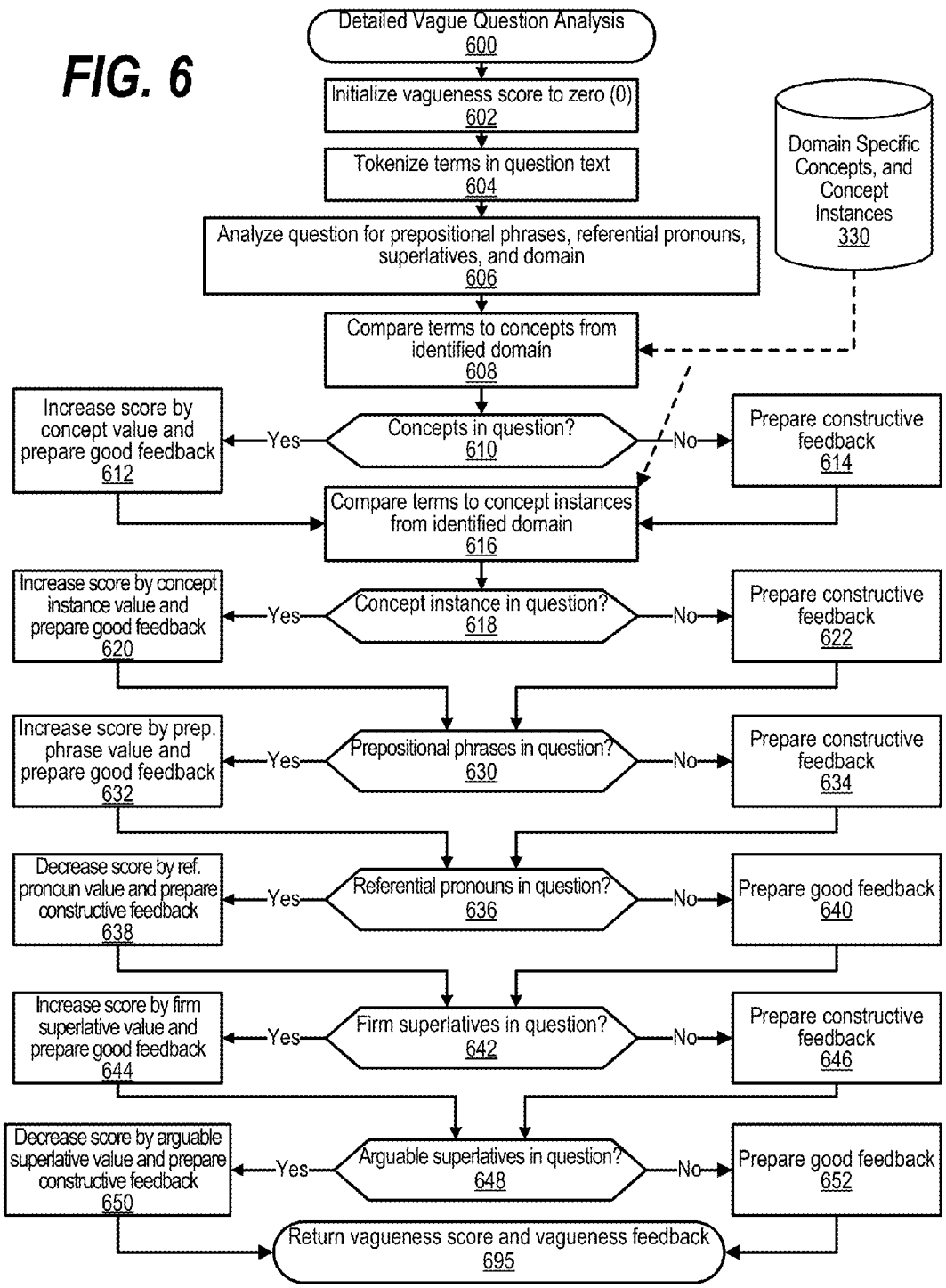
FIG. 6 is an exemplary flowchart that performs a detailed vague question analysis on the question being posed by the question provider.

At predefined process 530, the process performs the Detailed Vague Question Analysis routine (see FIG. 6 and corresponding text for processing details). The vagueness score computed by the Detailed Vague Question Analysis routine is stored in memory area 535. Any vagueness feedback generated by the Detailed Vague Question Analysis routine is stored in memory area 540. At step 532, the process provides any vagueness feedback generated by the Detailed Vague Question Analysis routine to the user (question requestor 310). This feedback may also include the vagueness score stored in memory area 535.

The process determines as to whether the vagueness score computed by predefined process 530 is unacceptable per the vagueness threshold value configured for the system (decision 550). If the vagueness score computed by predefined process 530 is unacceptable per the vagueness threshold value, then decision 550 branches to the 'yes' branch to perform steps 560 through 575. On the other hand, if the vagueness score computed by predefined process 530 is acceptable per the vagueness threshold value, then decision 550 branches to the 'no' branch bypassing steps 560 through 575.

At step 560, the process prompts the requestor to rephrase the question. The requestor can then rephrase the question based on the feedback provided to the requestor at step 532. in one embodiment, the requestor can override the system and submit a question that has been deemed to be vague based on the question's vagueness score. In this embodiment, the process determines whether the requestor has chosen to override the system (decision 570). If the requestor overrides the system, then decision 570 branches to the 'yes' branch whereupon the question is posed to the QA system even though it was deemed to be vague. On the other hand, if the requestor is not overriding the system or the ability to override the system is not provided, then decision 570 branches to the 'no' branch whereupon processing ends at 570. The requestor can then rephrase the question and the rephrased question text is received at step 510 which re-performs the steps described above on the rephrased question.

If the vagueness score does not indicate that the question is vague, or if the requestor was able to override a vagueness determination, then, at step 580, the process submits the question to QA system 100 for processing. At step 590, the process receives the answer(s) from the QA system and returns the answers to the question requestor. FIG. 5 processing thereafter ends at 595.

FIG. 6 is an exemplary flowchart that performs a detailed vague question analysis on the question being posed by the question provider. FIG. 6 processing commences at 600 and shows the steps taken by a process that performs a detailed vague question analysis on a question being posed by a requestor. At step 602, the process initializes the vagueness score to zero. At step 604, the process tokenizes the terms in the question text to prepare the question for analysis. At step 606, the process analyzes the question using the tokenized terms for prepositional phrases, referential pronouns, superlatives and domain. Domain can be determined, for example, by matching the question's terms against a stored list of terms characteristic of the domain. Alternatively, the domain may be known ahead of time, e.g., for a QA system for travel questions, the domain would be travel. The domain-related data is retrieved from data store 330. At step 608, the process compares terms found in the question to concepts retrieved from the identified domain (e.g., medicine, etc.). The domain specific concepts and concept instances are retrieved from data store 330.

The process determines as to whether concepts were found in the question (decision 610). If concepts were found in the question, then decision 610 branches to the 'yes' branch to perform step 612. On the other hand, if concepts were not found in the question, then decision 610 branches to the 'no' branch to perform step 614. At step 612, the process increases the vagueness score by the concept value set in the configuration settings and prepares good, or positive, feedback for the requestor. At step 614, the process prepares constructive feedback informing the requestor on how the question could be made less vague by including a concept in the question.

At step 616, the process compares terms found in the question to concept instances retrieved from the identified domain (e.g., "heart disease," etc.). The process determines as to whether one or more concept instances were found in the question (decision 618). If one or more concept instances were found in the question, then decision 618 branches to the 'yes' branch to perform step 620. On the other hand, if no concept instances were found in the question, then decision 618 branches to the 'no' branch to perform step 622. At step 620, the process increases the vagueness score by the concept instance value set in the configuration settings and prepare good, or positive, feedback for the requestor. At step 622, the process prepares constructive feedback informing the requestor on how the question could be made less vague by including a concept instance in the question.

The process determines as to whether one or more prepositional phrases were found in the question (decision 630). If one or more prepositional phrases were found in the question, then decision 630 branches to the 'yes' branch to perform step 632. On the other hand, if prepositional phrases were not found in the question, then decision 630 branches to the 'no' branch to perform step 634. At step 632, the process increases the vagueness score by the prepositional phrase value set in the configuration settings and prepares good, or positive, feedback regarding the inclusion of prepositional phrases in the question. At step 634, the process prepares constructive feedback informing the requestor on how the question could be made less vague by including prepositional phrases in the question.

The process determines as to whether referential pronouns were found in the question (decision 636). If referential pronouns were found in the question, then decision 636 branches to the 'yes' branch to perform step 638. On the other hand, if referential pronouns were not found in the question, then decision 636 branches to the 'no' branch to perform step 640. At step 638, the process decreases the vagueness score by the referential pronoun value set in the configuration settings and prepares constructive feedback informing the requestor on how the question could be made less vague by eliminating referential pronouns from the question. At step 640, the process prepares good, or positive, feedback for the requestor noting that referential pronouns were not found in the question.

The process determines as to whether any firm superlatives were found in the question (decision 642). If any firm superlatives were found in the question, then decision 642 branches to the 'yes' branch to perform step 644. On the other hand, if no firm superlatives were found in the question, then decision 642 branches to the 'no' branch to perform step 646. At step 644, the process increases the vagueness score by firm superlative value set in the configuration settings and prepares good, or positive, feedback for the requestor regarding the firm superlatives found in the question. At step 646, the process prepares constructive feedback informing the requestor on how the question could be made less vague by including firm superlatives in the question.

The process determines as to whether any arguable superlatives were found in the question (decision 648). If any arguable superlatives were found in the question, then decision 648 branches to the 'yes' branch to perform step 650. On the other hand, if no arguable superlatives were found in the question, then decision 648 branches to the 'no' branch to perform step 652. At step 650, the process decreases the vagueness score by arguable superlative value set in the configuration settings and prepares constructive feedback informing the requestor on how the question could be made less vague by eliminating arguable superlatives from the question. At step 652, the process prepares good, or positive, feedback for the requestor informing the requestor that arguable superlatives were not found in the question.

FIG. 6 processing thereafter returns to the calling routine (see FIG. 5) at 695. The routine returns the vagueness score that was computed based on the steps shown in FIG. 6. As previously described, the process performed by FIG. 5 uses the vagueness score to determine whether the question is identified as vague.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method, implemented by an information handling system that includes a memory and a processor, that improves a question answering (QA) system by reducing a number of vague questions submitted to the QA system, the method comprising:
   receiving a question that is submitted to the QA system;
   performing a vagueness question analysis on the question, wherein the vagueness question analysis results in a vagueness score, and wherein the analysis further:
      increases the vagueness score based on a set of linguistic features including a prepositional phrase in the question;
      increases the vagueness score based on the set of linguistic features including a firm superlative in the question;
      decreases the vagueness score based on the set of linguistic features including an arguable superlative in the question; and
      decreases the vagueness score based on the set of linguistic features including a referential pronoun in the question;
   submitting the question to the QA system in response to the vagueness score reaching a threshold value that indicates a lack of vagueness in the question; and
   inhibiting submission of the question to the QA system in response to the vagueness score failing to reach the threshold value.

2. The method of claim 1, wherein the performing the vagueness question analysis further comprises:
   analyzing the question using natural language processing (NLP) that discovers the set of linguistic features pertaining to the question.

3. The method of claim 2, further comprising:
   providing a set of feedback to a requestor of the question, wherein the set of feedback is based on one or more of the linguistic features discovered in the question.

4. The method of claim 3, further comprising:
   in response to the inhibiting the submission of the question to the QA system:
      providing one or more suggestions to improve the vagueness score of the question based on the linguistic features discovered in the question; and
      prompting the requestor to rephrase the question in light of the provided one or more suggestions.

5. The method of claim 2, wherein a higher vagueness score indicates a lower vagueness level of the question, wherein the method further comprises:
   increasing the vagueness score based on the set of linguistic features including at least one concept in the question; and
   increasing the vagueness score based on the set of linguistic features including at least one concept instance in the question.

6. The method of claim 1, further comprising:
   configuring the vagueness question analysis prior to receiving the question, wherein the configuring comprises:
      setting the threshold value;
      setting a first value to use when increasing the vagueness score based on the set of linguistic features including at least one concept in the question;
      setting a second value to use when increasing the vagueness score based on the set of linguistic features including at least one concept instance in the question;
      setting a third value to use when increasing the vagueness score based on the set of linguistic features including the prepositional phrase in the question;
      setting a fourth value to use when increasing the vagueness score based on the set of linguistic features including the firm superlative in the question;
      setting a fifth value to use when decreasing the vagueness score based on the set of linguistic features including the arguable superlative in the question; and
      setting a sixth value to use when decreasing the vagueness score based on the set of linguistic features including the referential pronoun in the question.

7. An information handling system comprising:
   one or more hardware processors;
   one or more data stores accessible by at least one of the one or more hardware processors;
   a hardware memory coupled to at least one of the one or more hardware processors; and
   a set of computer program instructions stored in the hardware memory and executed by at least one of the one or more hardware processors in order to improve a question answering (QA) system by reducing a number of vague questions submitted to the QA system by performing actions of:
   receiving a question that is submitted to the QA system;
   performing a vagueness question analysis on the question, wherein the vagueness question analysis results in a vagueness score, and wherein the analysis further:
      increases the vagueness score based on a set of linguistic features including a prepositional phrase in the question;
      increases the vagueness score based on the set of linguistic features including a firm superlative in the question;
      decreases the vagueness score based on the set of linguistic features including an arguable superlative in the question; and
      decreases the vagueness score based on the set of linguistic features including a referential pronoun in the question;
   submitting the question to the QA system in response to the vagueness score reaching a threshold value that indicates a lack of vagueness in the question; and
   inhibiting submission of the question to the QA system in response to the vagueness score failing to reach the threshold value.

8. The information handling system of claim 7, wherein the performing the vagueness question analysis further comprises:
   analyzing the question using natural language processing (NLP) that discovers the set of linguistic features pertaining to the question.

9. The information handling system of claim 8, further comprising:
   providing a set of feedback to a requestor of the question, wherein the set of feedback is based on one or more of the linguistic features discovered in the question.

10. The information handling system of claim 9, further comprising:

in response to the inhibiting the submission of the question to the QA system:
  providing one or more suggestions to improve the vagueness score of the question based on the linguistic features discovered in the question; and
  prompting the requestor to rephrase the question in light of the provided one or more suggestions.

11. The information handling system of claim 8, wherein a higher vagueness score indicates a lower vagueness level of the question, wherein the method further comprises:
  increasing the vagueness score based on the set of linguistic features including at least one concept in the question; and
  increasing the vagueness score based on the set of linguistic features including at least one concept instance in the question.

12. The information handling system of claim 7, further comprising:
  configuring the vagueness question analysis prior to receiving the question, wherein the configuring comprises:
    setting the threshold value;
    setting a first value to use when increasing the vagueness score based on the set of linguistic features including at least one concept in the question;
    setting a second value to use when increasing the vagueness score based on the set of linguistic features including at least one concept instance in the question;
    setting a third value to use when increasing the vagueness score based on the set of linguistic features including the prepositional phrase in the question;
    setting a fourth value to use when increasing the vagueness score based on the set of linguistic features including the firm superlative in the question;
    setting a fifth value to use when decreasing the vagueness score based on the set of linguistic features including the arguable superlative in the question; and
    setting a sixth value to use when decreasing the vagueness score based on the set of linguistic features including a referential pronoun in the question.

13. A computer program product stored in a computer readable storage medium, comprising computer program code that, when executed by an information handling system, causes the information handling system to improve a question answering (QA) computer system by reducing a number of vague questions submitted to the QA system by performing actions comprising:
  receiving a question that is submitted to the QA system;
  performing a vagueness question analysis on the question, wherein the vagueness question analysis results in a vagueness score, and wherein the analysis further:
    increases the vagueness score based on a set of linguistic features including a prepositional phrase in the question;
    increases the vagueness score based on the set of linguistic features including a firm superlative in the question;
    decreases the vagueness score based on the set of linguistic features including an arguable superlative in the question; and
    decreases the vagueness score based on the set of linguistic features including a referential pronoun in the question;
  submitting the question to the QA system in response to the vagueness score reaching a threshold value that indicates a lack of vagueness in the question; and
  inhibiting submission of the question to the QA system in response to the vagueness score failing to reach the threshold value.

14. The computer program product of claim 13, wherein the performing the vagueness question analysis further comprises:
  analyzing the question using natural language processing (NLP) that discovers the set of linguistic features pertaining to the question.

15. The computer program product of claim 14, further comprising:
  providing a set of feedback to a requestor of the question, wherein the set of feedback is based on one or more of the linguistic features discovered in the question.

16. The computer program product of claim 15, further comprising:
  in response to the inhibiting the submission of the question to the QA system:
    providing one or more suggestions to improve the vagueness score of the question based on the linguistic features discovered in the question; and
    prompting the requestor to rephrase the question in light of the provided one or more suggestions.

17. The computer program product of claim 14, wherein a higher vagueness score indicates a lower vagueness level of the question, wherein the method further comprises:
  increasing the vagueness score based on the set of linguistic features including at least one concept in the question; and
  increasing the vagueness score based on the set of linguistic features including at least one concept instance in the question.

* * * * *